United States Patent
Vandenberg

[15] 3,678,136
[45] July 18, 1972

[54] FLAME RETARDANT POLYOLEFINS
[72] Inventor: Edwin J. Vandenberg, Wilmington, Del.
[73] Assignee: Hercules Incorporated, Wilmington, Del.
[22] Filed: June 24, 1970
[21] Appl. No.: 49,560

[52] U.S. Cl. ............260/897 C, 260/45.75 R, 260/876 B, 260/876 R, 260/897 R, 260/DIG. 24
[51] Int. Cl. ............................................C08f 29/12
[58] Field of Search ........................260/897, DIG. 24

[56] References Cited

UNITED STATES PATENTS

| | | | |
|---|---|---|---|
| 3,151,928 | 10/1964 | Cappuccio et al. | 8/115.5 |
| 3,445,544 | 5/1969 | Schmitt | 260/876 |
| 3,075,944 | 1/1963 | Wick et al. | 260/41 |
| 3,349,069 | 10/1967 | Davis et al. | 260/92.3 |
| 3,351,517 | 11/1967 | Willis | 161/184 |
| 3,271,344 | 9/1966 | Lowes | 260/29.6 |

Primary Examiner—Samuel H. Blech
Assistant Examiner—C. Seccerro
Attorney—Hazel L. Denning

[57] ABSTRACT

Polyolefins are rendered flame retardant by the addition of a small amount of a polymer of epibromohydrin having an RSV of at least about 0.08. Preferably, the flame retardant polyolefins contain at least about 10% of the polymer of epibromohydrin when it is the sole flame retardant or at least about 4% of the polymer combined with from about 1 to 15% of an antimony compound.

4 Claims, No Drawings

FLAME RETARDANT POLYOLEFINS

This invention relates to improving the flame retardancy of polyolefins without major impairment of the physical and mechanical properties of the polymer and to the improved flame retardant compositions produced thereby.

It is known that the flame retardancy of readily flammable plastics can be improved by the incorporation of halogen compounds, and particularly chlorinated hydrocarbons therein. Relatively large amounts of the chlorinated hydrocarbon and an inorganic flame retardant such as antimony trioxide, however, are required to produce an acceptable flame resistant plastic. The inclusion of such large amounts of flame retardant materials in plastics results in an impairment of the physical properties of the plastics.

It is also known that certain bromine compounds are more effective flameproofing agents than the corresponding chlorine compounds, and that flame retardancy can be achieved with much smaller amounts of additives. Most bromine-containing compounds, however, are not stable at the elevated temperatures required for molding or spinning into fibers such polyolefins as polypropylene.

It is an object of the present invention to provide flame retardant compositions of polyolefins using small amounts of flame retardant additives. Another object is to provide compositions which can be molded into articles which meet the various established flame retardancy standards and at the same time have improved physical properties.

Now in accordance with the present invention it has been found that the aforesaid objects can be achieved through the use of polyolefinic compositions which contain as a flame retardant, based on the weight of the composition, at least about 10% and preferably from about 10 to about 20% of a polymer of epibromohydrin when it is the sole flame retardant or at least about 4% and preferably from about 4 to about 20% of said polymer combined with from about 1 to 15% and preferably from about 1 to 5% of an antimony compound, said polymer having an RSV of at least about 0.08.

The flame retardant compositions of the present invention meet the requirements of ASTM D-635 and have a combustion index of at least 0.21, measured according to the method of C. P. Fenimore and F. C. Martin, "Combustion and Flame", 10, 135 (1966). Thus the invention provides flame retardant compositions from polyolefins with very little or no antimony compound, and relatively low amounts of the polymer of epibromohydrin. Moreover, because of the small amounts of flame retardant constituents required, the compositions have improved physical properties, such as for example, greater impact strength, higher flexural strength, higher tensile strength and decreased opacity as compared with the prior art flame retardant compositions containing much larger amounts of halogenated material and antimony trioxide. Additionally, because the polymers of epibromohydrin having an RSV of at least about 0.08 are thermally stable at conventional molding or extrusion temperatures, problems of discoloration and voiding in molded articles, mold corrosion, or loss of additives during processing are not encountered.

The polymers of epibromohydrin which are useful in the present invention are preferably the amorphous or crystalline homopolymers having an RSV of at least about 0.08 measured as a 0.1% solution in tetrachloroethane at 25° C. or at 100° C. Copolymers of epibromohydrin containing up to about 50 molar per cent of a different epoxide wherein the epoxy group is an oxirane ring can also be used. However, since the presence of another monomer will decrease the total number of epibromohydrin units present in the polymer, and hence the overall effectiveness, the use of copolymers is not usually advantageous. Comonomers that can be polymerized with epibromohydrin to give useful copolymers include the alkylene oxides such as ethylene oxide, propylene oxide, 1-butene oxide, cis and trans 2-butene oxides, isobutylene oxide, 1-hexene oxide; the substituted alkylene oxides such as cyclohexene oxide, epoxycyclooctene, styrene oxide; the alkyl glycidyl ethers such as methyl glycidyl ether, ethyl glycidyl ether, isopropyl glycidyl ether and butyl glycidyl ether; glycidyl ethers of phenol, bis-phenol and the like; unsaturated epoxides such as vinyl cyclohexene mono- and dioxides, butadiene monoxides, allyl glycidyl ether, allyl phenyl glycidyl ether and crotyl phenyl glycidyl ether, and other epihalohydrins such as epichlorohydrin, epiiodohydrin and epifluorohydrin. Typical polymers and copolymers are described in U.S. Pat. Nos. 3,158,580, 3,158,581 and 3,158,591.

The epibromohydrin polymers of the invention will have a weight average molecular weight of at least about 10,000 and preferably of the order of about 20,000 and higher. The polymers of epibromohydrin can be prepared in known manner, as by polymerizing epibromohydrin or mixtures thereof with a different epoxide as described in U.S. Pat. Nos. 3,135,705, 3,135,706, 3,280,045, and 3,415,761.

The polyolefins which can be made flame retardant in accordance with this invention are any of the linear atactic or crystalline polymers or nonlinear amorphous polymers, copolymers, terpolymers, etc. of the $\alpha$-olefins as for example polyethylene, polypropylene, poly(4-methyl pentene-1), polybutene-1, polystyrene, ethylene–propylene copolymer, ethylene–propylene–dicyclopentadiene terpolymer, etc. and blends of these polymers with each other. The preferred polyolefins are homopolymers or random, block or graft copolymers of $\alpha$-olefins containing from two to six carbon atoms. Particularly preferred are the polymers of propylene. These polymers usually have molecular weights between about 100,000 and 800,000 or higher and can be produced by well known and conventional methods. Particularly useful are stereoregular or isotactic polypropylenes having a melt index range of at least about 0.3 to 20 and preferably about 3 to 5. Typical comonomers useful for the preparation of propylene copolymers include other $\alpha$-olefins such as ethylene, butene-1, 3-methyl butene-1, 4-methyl pentene-1, dodecene-1, styrene and the like. Typical comonomers which can be grafted to the propylene polymer chain to give a so-called graft copolymer include vinyl acetate, vinyl propionate, the acrylic and methacrylic esters of aliphatic alcohols and the like.

If desired the polymer of epibromohydrin can also be used in combination with an antimony compound such as antimony trioxide, triphenylstibine, antimony sulfide, antimony naphthenate or the like to provide a synergistic effect. When an antimony compound is present, less polymer of epibromohydrin is required and flame retardant compositions can be produced with from about 4 to about 20% of the polymer combined with from about 1 to 15% of an antimony compound. Small amounts of other additives such as stabilizing agent lubricants, dye additives, pigments, antistatic agents and the like, up to a total of about 10% by weight of the composition can also be present provided, of course, that the amount of such additives does not detract from the flame retardancy of the composition.

The compositions of the invention can be prepared by mixing the polyolefin with the flame retardant, i.e. the polymer of epibromohydrin and antimony compound, if present, in conventional manner, e.g. on roll mills, kneaders or extruders or by agitating in the presence of an organic solvent. Since uniform mixing of the constituents is essential to reliable results, the mixing operation is preferably carried out by first dry mixing the ingredients and then subjecting the dry mixture to intensive mechanical working at elevated temperatures above the softening point of the polyolefin and most conveniently by means of compounding rolls, a Banbury mixer or extruder and continuing the working until a uniform mixture is obtained.

The compositions of the invention are suitable for the production of molded articles by the usual processing methods and are particularly suitable for the production of film, fiber and plastic molded articles.

The invention is further illustrated by the following examples wherein all parts and percentages are by weight unless otherwise specified. Throughout this specification the term "flame retardant" is used to designate a composition or article which will be self-extinguishing or non-burning when tested according to ASTM D-635 and will have a combustion index of at least 0.21.

EXAMPLES 1-5

In these examples various molding compositions were prepared by mixing stereoregular polypropylene flake with the desired amount of poly(epibromohydrin) as a 10% solution in acetone, removing the acetone and drying under vacuum, and then intimately blending the dried mixture (and any antimony trioxide or stabilizer), on a two-roll mill at 175° C. for 10 minutes and then compression molding the blends into ⅛-inch plaques using a 4,000 p.s.i.g. press at 175° C. for 10 minutes. The polypropylene used in these examples was a commercial stereoregular polypropylene having a melt index of 4, and an RSV (determined on a 0.1% solution in decahydronaphthalene at 135° C.) of 2.9. The poly(epibromohydrin) was an amorphous polymer having an RSV of 0.4 determined on a 0.1% solution in tetrachloroethane at 25° C. and contained 58.5% bromine. The antimony trioxide, when present, was in finely divided form and passed a U.S. Standard Sieve No. 200.

Details as to the amount of each component in the compositions and flame retardancy test results on the molded plaques therefrom are given in the following Table I.

TABLE I

| Example Number | Composition (parts by weight) | | | Flame retardancy | |
|---|---|---|---|---|---|
| | Polypropylene | Poly-(epibromohydrin) | Antimony trioxide | Combustion index | Rating (ASTM D-635) |
| Control A | 100 | | | 0.178 | Burning. |
| 1 | 90 | 10 | | 0.208 | Self-extinguishing. |
| 2 | 88 | 10 | 2 | 0.248 | Non-burning. |
| 3 | 86 | 10 | 4 | 0.265 | Do. |
| 4 | ¹86 | 10 | 4 | 0.259 | Do. |
| 5 | 95 | 4 | 1 | 0.213 | Self-extinguishing. |
| Control B | 95 | | 5 | 0.178 | Burning. |

¹ Contains 2 parts of dibasic lead phthalate as stabilizer.

EXAMPLE 6

The procedure of Examples 1 to 5 was repeated except that the molding composition was prepared by intimately blending 90 parts of the polypropylene of Examples 1 to 5 and 10 parts of an amorphous poly(epibromohydrin) having an RSV of 0.36 (determined on a 0.1% solution in tetrachloroethane at 25° C.). Flame retardancy test results on the molded plaques gave a combustion index of 0.211 and the plaques were rated as self-extinguishing according to ASTM D-635. A control treated in the same manner except that no poly(epibromohydrin) was present had a combustion index of 0.178 and was rated as burning.

EXAMPLE 7

The procedure of Example 6 was repeated except that 10 parts of an amorphous poly(epibromohydrin) having an RSV of 0.08 (determined on a 0.1% solution in tetrachloroethane at 25° C.) was substituted for the poly(epibromohydrin) having an RSV of 0.36. Flame retardancy test results on the molded plaques gave a combustion index of 0.210 and the plaques were rated as self-extinguishing according to ASTM D-635. A control treated in the same manner except that no poly(epibromohydrin) was present had a combustion index of 0.178 and was rated as burning.

EXAMPLE 8

The procedure of Example 6 was repeated except that 13 parts of a highly crystalline poly(epibromohydrin) having an RSV of 0.9 (determined on a 0.1% solution in tetrachloroethane at 100° C.) was substituted for the amorphous poly(epibromohydrin) having an RSV of 0.36 and 87 parts of the polypropylene were used. Flame retardancy test results on the molded plaques gave a combustion index of 0.21 and the plaques were rated as self-extinguishing. A control treated in the same manner except that no poly(epibromohydrin) was present had a combustion index of 0.178 and was rated as burning.

What I claim and desire to protect by Letters Patent is:

1. A flame retardant composition comprising a blend of a crystalline poly($\alpha$-monoolefin) wherein the olefin contains two to six carbon atoms and as a flame retardant, based on the weight of the composition, at least about 10% of a polymer of epibromohydrin when it is the sole flame retardant or at least about 4% of said polymer of epibromohydrin combined with 1 to 15% of an antimony compound, said polymer of epibromohydrin having an RSV of at least about 0.08 and being a homopolymer of epibromohydrin or a copolymer of epibromohydrin and up to 50 molar percent of a different epoxide wherein the epoxide group is an oxirane ring.

2. The composition of claim 1 wherein the poly($\alpha$-monoolefin) is a homopolymer of propylene.

3. The composition of claim 2 wherein the polymer is a homopolymer of epibromohydrin.

4. The composition of claim 3 wherein the antimony compound is antimony trioxide.

* * * * *